(12) United States Patent
Turner et al.

(10) Patent No.: US 8,454,031 B2
(45) Date of Patent: *Jun. 4, 2013

(54) COMBINATION SCOOTER/BACKPACK

(76) Inventors: Michael Hughesdon Turner, Arlington, VA (US); Ryan Patrick Murphy, Hermosa Beach, CA (US); Duston E A Stutzman, Goshen, IN (US); Kah-Thart Goo, Ipoh (MY)

( * ) Notice: Subject to any disclaimer, the term of this patent is extended or adjusted under 35 U.S.C. 154(b) by 133 days.

This patent is subject to a terminal disclaimer.

(21) Appl. No.: 12/662,580

(22) Filed: Apr. 23, 2010

(65) Prior Publication Data
US 2011/0031721 A1 Feb. 10, 2011

Related U.S. Application Data

(63) Continuation of application No. 12/230,030, filed on Aug. 21, 2008, now Pat. No. 7,731,204, which is a continuation of application No. 11/340,504, filed on Jan. 27, 2006, now Pat. No. 7,431,311.

(60) Provisional application No. 60/647,346, filed on Jan. 27, 2005.

(51) Int. Cl.
*B60N 2/28* (2006.01)

(52) U.S. Cl.
USPC ............ 280/30; 280/639; 280/47.26; 280/37; 190/18 A

(58) Field of Classification Search
USPC .......... 280/30, 47.26, 37, 47.2, 47.18, 47.38, 280/648, 655, 650; 190/18 A, 34
See application file for complete search history.

(56) References Cited

U.S. PATENT DOCUMENTS

| | | |
|---|---|---|
| 3,314,494 A | 4/1967 | Weitener |
| 3,413,011 A | 11/1968 | Weitzner |
| 3,917,038 A | 11/1975 | Foge et al. |
| 4,145,065 A | 3/1979 | Kupka |
| 4,254,850 A | 3/1981 | Knowles |
| 4,273,222 A | 6/1981 | Cassimally et al. |
| 4,368,835 A | 1/1983 | Murphy |
| D268,938 S | 5/1983 | Carmagnola et al. |
| 4,586,721 A | 5/1986 | Harada et al. |
| D295,990 S | 5/1988 | Hanna et al. |
| 4,845,804 A | 7/1989 | Garrett |
| 4,913,252 A | 4/1990 | Bartley et al. |
| 5,228,706 A | 7/1993 | Boville |
| 5,374,073 A | 12/1994 | Hung-Hsin |
| 5,533,231 A | 7/1996 | Bai |

(Continued)

FOREIGN PATENT DOCUMENTS

DE  31 38 095  7/1983

*Primary Examiner* — Hau Phan

(57) ABSTRACT

The combination scooter/backpack is an article carrying device with the capacity to be converted into a wheeled land vehicle, and therefore has two modes of usage. The article carrying device resembles a conventional backpack with two straps positioned to be placed over the user's shoulders, entitled backpack mode. The wheeled land vehicle functions as a popular collapsible scooter, two wheels mounted upon a board member with propulsion means provided by user's contact with the ground, entitled scooter mode. A horizontal handlebar is positioned at the top of the combination and serves to steer the front wheel during scooter mode. Conversion between backpack mode and scooter mode is accomplished with the raising and lowering of said handlebar and the manipulation of releasable fasteners and latches. In both backpack and scooter modes, a cover circumferentially surrounds the combination scooter/backpack to secure and protect components that are not in use.

14 Claims, 24 Drawing Sheets

U.S. PATENT DOCUMENTS

| | | |
|---|---|---|
| 5,709,400 A | 1/1998 | Bonnier et al. |
| 5,813,503 A | 9/1998 | Chang |
| 5,820,146 A | 10/1998 | Van Ligten |
| 5,984,326 A | 11/1999 | Abraham et al. |
| 6,182,981 B1 | 2/2001 | Kuo |
| 6,289,554 B1 | 9/2001 | Wang |
| 6,315,307 B1 | 11/2001 | Chen et al. |
| 6,367,602 B1 | 4/2002 | Chang |
| 6,425,589 B1 | 7/2002 | Wu |
| 6,446,987 B2 | 9/2002 | Abraham et al. |
| 6,460,866 B1 | 10/2002 | Altschul et al. |
| 6,478,315 B1 | 11/2002 | Manesis |
| 6,497,311 B2 | 12/2002 | Treman et al. |
| 6,604,615 B2 | 8/2003 | Wu |
| 6,688,614 B2 | 2/2004 | Hsu |
| 7,029,015 B2 | 4/2006 | Lin |
| 7,066,311 B2 | 6/2006 | O'Shea |
| 7,237,660 B2 | 7/2007 | Wu |
| 7,389,997 B2 | 6/2008 | Johnson et al. |
| 7,431,311 B2 * | 10/2008 | Turner et al. ............ 280/30 |
| 7,503,439 B2 | 3/2009 | O'Shea et al. |
| 7,731,204 B2 * | 6/2010 | Turner et al. ............ 280/30 |
| 2002/0162716 A1 | 11/2002 | Fabritz |
| 2004/0056442 A1 | 3/2004 | Ostrowski et al. |
| 2004/0094919 A1 | 5/2004 | Roder et al. |
| 2004/0238303 A1 | 12/2004 | Hafif |

* cited by examiner

COMBINATION SCOOTER/BACKPACK

CROSS REFERENCE TO RELATED APPLICATIONS

This application is a continuation of Ser. No. 12/230,030 Aug. 21, 2008 now U.S. Pat. No. 7,731,204 which is a continuation of Ser. No. 11/340,504 Jan. 27, 2006 now U.S. Pat. No. 7,431,311 which claims benefit under 35 U.S.C. §119 of provisional patent application No. 60/647,346 filed on Jan. 27, 2005 and entitled "Combination Scooter/backpack," the entire contents of such applications are hereby incorporated by reference.

BACKGROUND OF THE INVENTION

The presented invention involves an apparatus for article carrying. The apparatus is generally a wheeled article carrier with the capacity to convert into a rider-operated scooter. Additionally, the article carrying function of the apparatus is not lost when the scooter is in use.

Presently, students and travelers of all ages employ back or shoulder carried devices to carry their belongings. Supporting these heavy loads, especially over extended periods of time, has been shown to promote muscular and skeletal back injuries. This occurs most commonly while walking long distances, for example, a child's walk to and from school or a tourist's path to and from a train station. The present invention allows those distances to be traversed without any stress on the back, therefore saving the child, or user, from injury. Currently this product exists as two separate products, a backpack and a scooter, but they cannot be used together in the beneficial manner this invention proposes. Combining the equipment therefore creates a unique solution to an everyday problem.

SUMMARY OF INVENTION

The present invention is an article carrier with several modes of transportation provided in it. The carrier takes the form of a traditional flexible container with a strap positioned on a single face. Opposite said face is attached a rigid two-piece frame which makes contact along the vertical height of the carrier and bends around underneath providing support. Inserted into the frame is a telescoping steering column assembly that runs along the vertical height of the carrier and is positioned in the center of said frame. The steering column assembly attaches to a single pivoting wheel at the bottom of the frame and a handlebar at the top. The handlebar can be raised above and lowered to the top face of the carrier while the wheel remains stationary. Only when in the raised position, the handlebar exerts a torque on the wheel through the steering column providing steering control. Attached opposite the carrier on the frame is a board that pivots around a hinge at the base of the frame. The board is linked to the handlebar in such a way that raising the handlebar rotates the board around this hinge and extends outwardly in a horizontal fashion. Similarly, lowering the handlebar lifts the board back to its vertically oriented position against the face of the plastic frame. A second immovable wheel is embedded into the far end of the board enabling rolling upon two wheels to occur when the board is extended. A braking mechanism makes contact with a portion of this rear wheel. A cover piece is attached along its edge to a horizontal face of the carrier adjacent to either face containing the straps or frame. This cover piece circumferentially surrounds the carrier in either direction and fastens to its opposite face. Once fastened, the cover piece secures the shoulder straps to the carrier or the pivoting board to the frame, creating an aesthetic, safe, and organized appearance.

With these features in place, the carrier has two suggested modes of transportation, while others are possible. The first mode is to place the strap around a wearer's shoulder and place the bag on the back in a traditional backpack position. The handlebar is in the lowered position, adjacent the top of the frame. The board is in the vertical position, parallel to the frame, and the fabric is wrapped around it, securing it to the frame away from the wearer. This provides a source of comfort since the rigid components of the frame assembly are not in contact with the wearer's back.

The second mode is a riding mode. The handlebar is in the raised position and the board is linked mechanically to extend parallel to the ground. The handlebar is connected to the front caster through the steering column and provides steering control. The cover piece is wrapped around the shoulder straps securing them to the carrier. The user stands with one or both feet upon the board and their weight is distributed amongst the two casters. The article carrier is deposed in front of the user on the opposite side of the frame, secured and balanced about the front wheel by the weight of the user. The user can then push the board with a foot upon the ground and roll to the destination while steering with the handlebar.

These features function together to provide: a spacious flexible container with a strap, a comfortably distributed load when device is upon wearer's back, a balanced two-wheeled ride upon a scooter, a weightless and stress-free carrying of personal belongings, a faster than walking means of locomotion, a practical and simple steering mechanism, a selectively separable board and bag that prevents the wearer or rider from misplacing the scooter or bag respectively, convenient and continual access to both said bag and scooter simultaneously, an organized aesthetic appearance during use in either mode, and a unique and expedited bag to scooter conversion process.

BRIEF DESCRIPTION OF THE DRAWINGS

The invention can be further described by the following figures, whereby.

DETAILED DESCRIPTION

Figure 1:
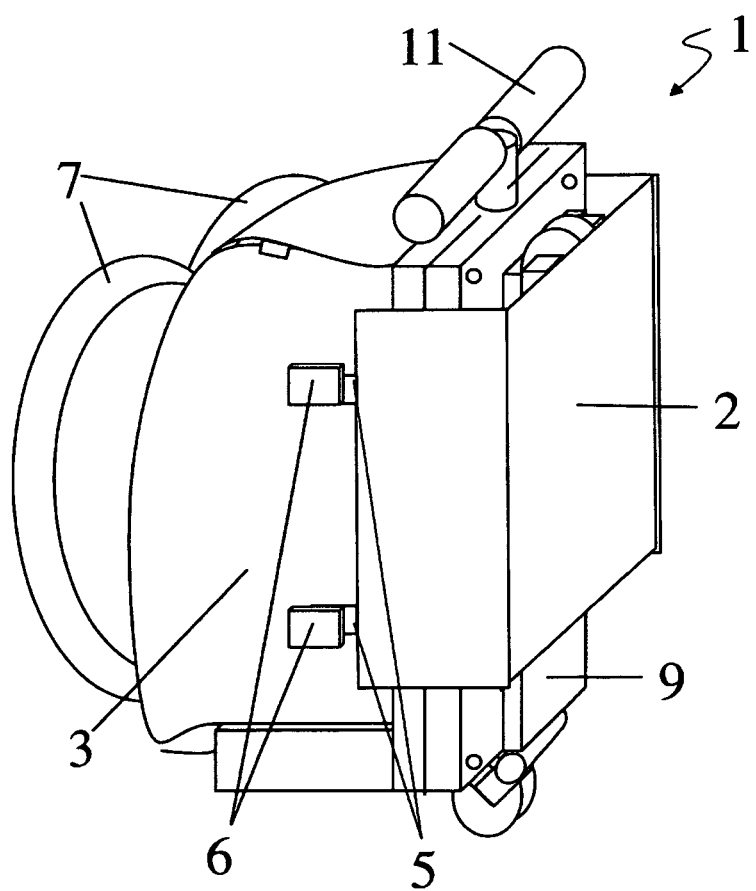
FIGS. 1, 2, and 3 are isometric views of a scooter/backpack according to the present invention.

The preferred embodiment of the combination scooter/backpack 1 can be seen in FIG. 1. The combination scooter/backpack 1 is shown in its backpack mode. The bag 3 has two padded shoulder straps 7 attached in conventional backpack locations. In the preferred embodiment means are provided to adjust length of each strap to accommodate varying sizes of wearer. An edge of flap 2 is sown vertically upon the face of bag 3, parallel to the L-shaped plastic frame section 4. It secures to the opposite face of bag 3 through the interaction of male 5 and female 6 clips of the type common to the backpack industry. The flap 2 is capable of wrapping around said scooter/backpack 1 in either direction, thereby securing either the shoulder straps 7 to the bag 3 for scooter mode, or the board 9 to the I-shaped plastic frame section 8 for backpack mode. The flap 2 assists to retain board 9 in a manageable position so as to avoid contact with passers by or the like while creating an organized and aesthetically pleasing appearance. Flap 2 is preferably made of a flexible yet durable material such as nylon fabric, yet other materials may be used.

Figure 2:
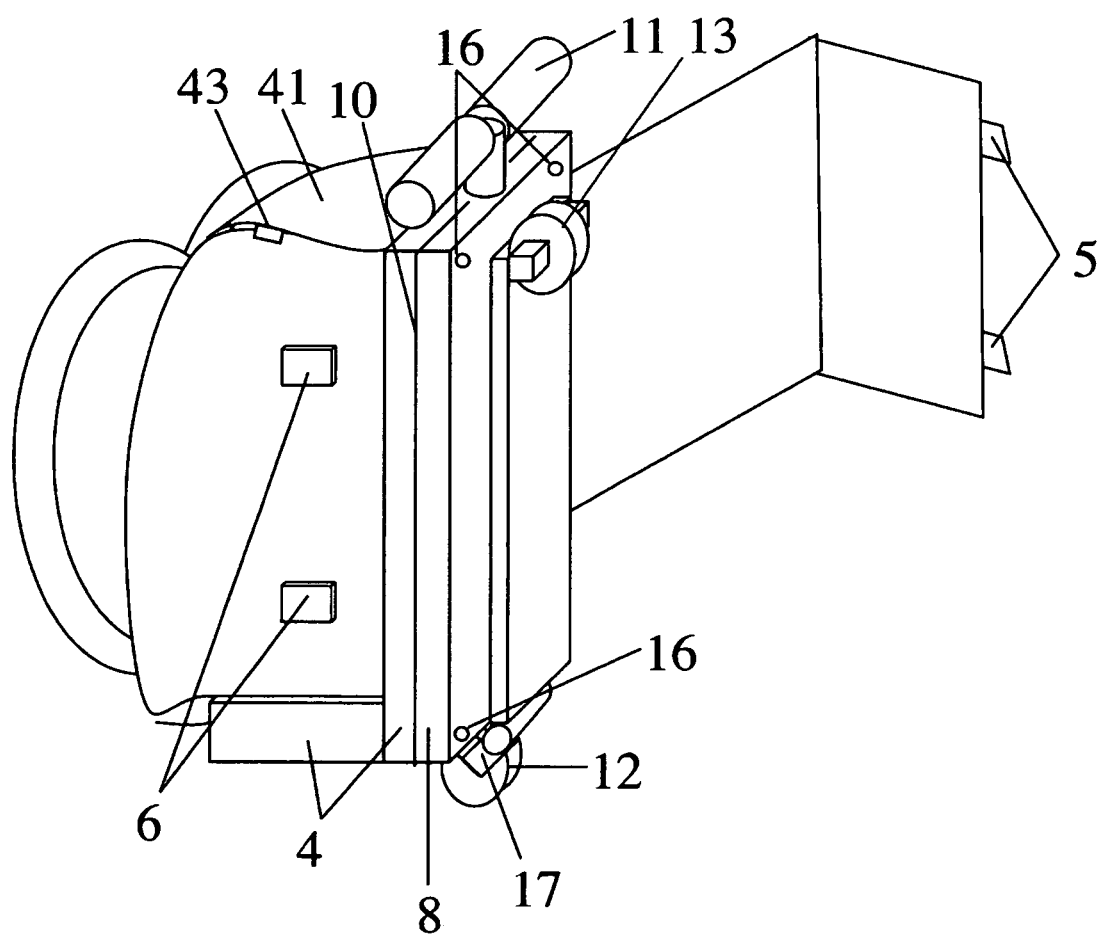

As seen in FIG. 2, the male clips 5 have been released from female clips 6 and flap 2 has been uncurled. The L-shaped plastic frame section 4 functions to support the bag 3 and its contents. L-shaped plastic frame section 4 mates along plastic frame seam 10 with the I-shaped plastic frame section 8 through fasteners 16. Preferably, frame sections 4 and 8 are constructed from medium density plastics for strength and weight considerations. In accordance with the backpack mode of the present invention, board 9 lies vertically against I-shaped plastic frame section 8 while a handlebar 11 is in its lowered position. The front wheel 12 is underneath the plastic frame sections and is connected to the handlebar 11 as part of steering column assembly 14, not shown. The steering column assembly 14 stands between the plastic frame sections 4 and 8. Attached to the far end of board 9 is rear wheel 13. Also shown in FIG. 2, are lid 41 and lid fastener 43. In preferred embodiments of the invention, lid 41 is the portion of bag 3 that is adjacent a closable opening. Lid fastener 43 serves to release lid 41 when access to the contents of bag 3 is desired and close lid 41 to secure belongings for transport or security reasons. Lid fastener 43 could be construed as, but not limited to, such commonly understood fastener types as buttons, zippers, snaps, etc.

Figure 3:
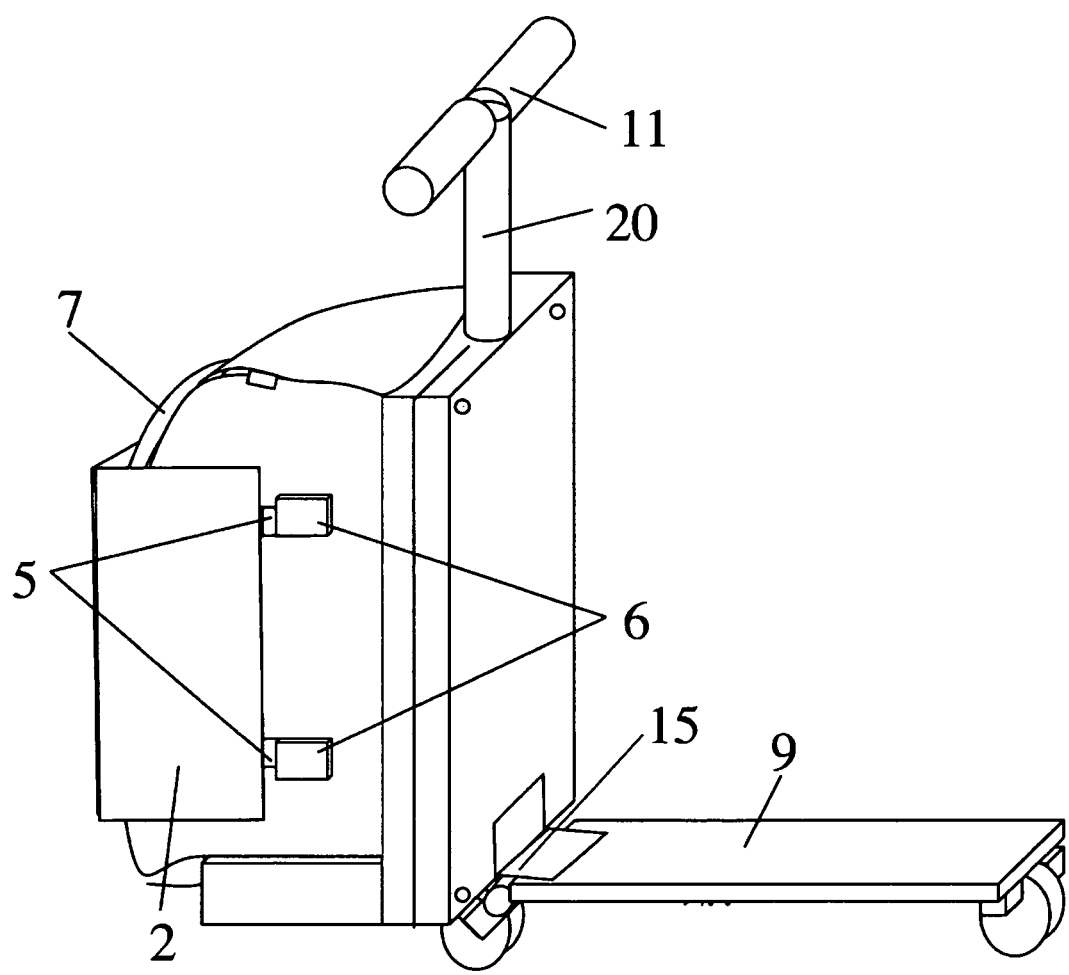

FIG. 3 shows flap 2 surrounding shoulder straps 7 during scooter mode. Handlebar 11 is raised to its elevated position exposing inner column 20, which is a portion of steering column assembly 14. Board 9 is lowered and ready to be stepped upon by the user. Board 9 is connected to the I-shaped plastic frame 8 through hinge assembly 15. Hinge assembly 15 consists of hinge pin 28, board plate 29, and frame plate 39. Additionally, board 9 is connected to the steering column assembly 14 through linkage arms 17. This enables the raising and lowering of handlebar 11 to rotate board 9 between stowed and extended positions. This feature relies on the mechanism of steering column assembly 14 as will be seen, and is extremely convenient for the user. Effectively, the user can stow or extend the board 9 without crouching or stooping down to manipulate the board by hand, thereby avoiding any possible back discomfort due to such positions.

Figure 4A:
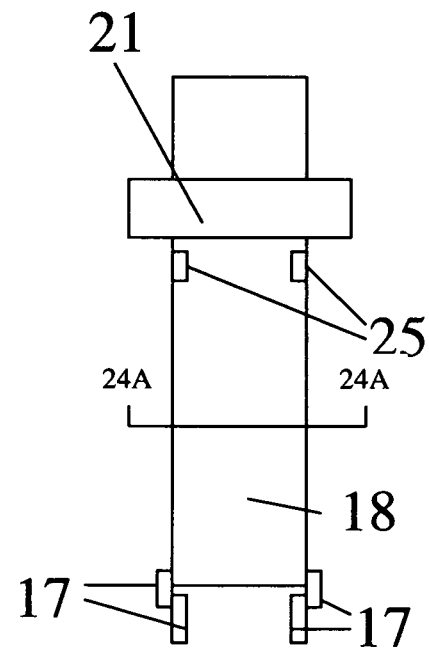
FIGS. 4A, 4B, and 4C are front views of each steering column member.
Figure 24A:
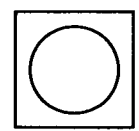
FIGS. 24A, 24B, and 24C are cross-sectional views of each steering column member.
Figure 4B:
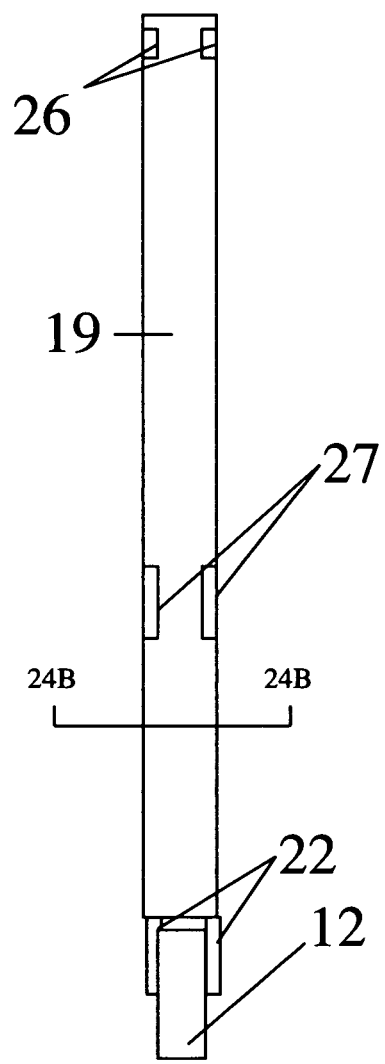
Figure 24B:
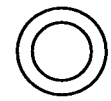
Figure 4C:
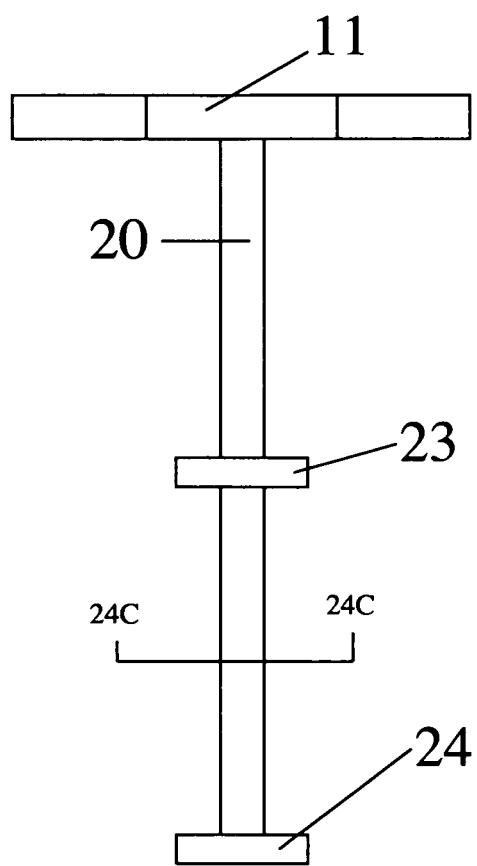

FIGS. 4A, 4B, and 4C detail the steering column components of the steering column assembly 14. The outer column 18, middle column 19, and inner column 20 stand concentrically in a telescoping fashion. As seen in FIG. 24A, outer column 18 has a rectangular outer perimeter and circular inner diameter to accommodate the middle column 19. Thickness 21 is provided around outer column 18 to limit the vertical travel of said column within the plastic frame sections. Linkage arms 17 are connected to the bottom of the outer column 18 through pivot connections, as will be shown in more detail later. Outer column 18 also contains openings 25 to accept lower button set 24. As can be seen in FIGS. 4B and 24B, middle column 19 stands the tallest among the three columns. It has circular outer and inner perimeters, the outer small enough to slide within the outer column 18 and an inner large enough to accommodate the inner column 20. The front wheel 12 is connected to the bottom of the middle cylinder through front forks 22 in a standard axle configuration. Middle column 19 contains one set of openings 26 and one set of slots 27 to accept upper and lower button sets 23 and 24.

Figure 24C:

In FIG. 4C the inner column member 20 is shown. Inner column member 20 stands inside the middle column member 19 and travels up and down with movement of the handlebar 11. As seen in FIG. 24C, the inner and outer perimeters of inner column 20 are circular. To retain certain vertical positions within middle column 19 the inner column member 20 employs upper and lower button sets 23 and 24. Upper and lower button sets 23 and 24 are generally of rectangular shape and extend outwards engaging the openings 25 and 26 and slots 27 of outer and middle columns 18 and 19. Button sets 23 and 24 are spring loaded and require depression by the user to sink into the inner column 20 effectively disengaging them from the corresponding openings or slots. While positioned inside middle column 19, only one button set can extend at a time. As will be shown, lower button set 24 is used to engage both outer column 18 and middle column 19 to the inner column 20, while upper button set 23 engages openings 26 for transmitting torque from the handlebar 11 to the front wheel 12 during steering.

Furthermore, it can be shown that a variety of different shapes, dimensions, quantities of, and placement positions on said steering column assembly 14 for said button sets 23 and 24 and openings 25 and 26 and slot 27 are advantageous over one another for reasons of steering mechanics, varying sizes of riders, ease of manufacturing, load distribution, overall aesthetics, etc. It is therefore not the intention of the proposed invention to limit itself in any one of these configurations, rather to simply establish a means to perform necessary functions of the invention.

Figure 5:
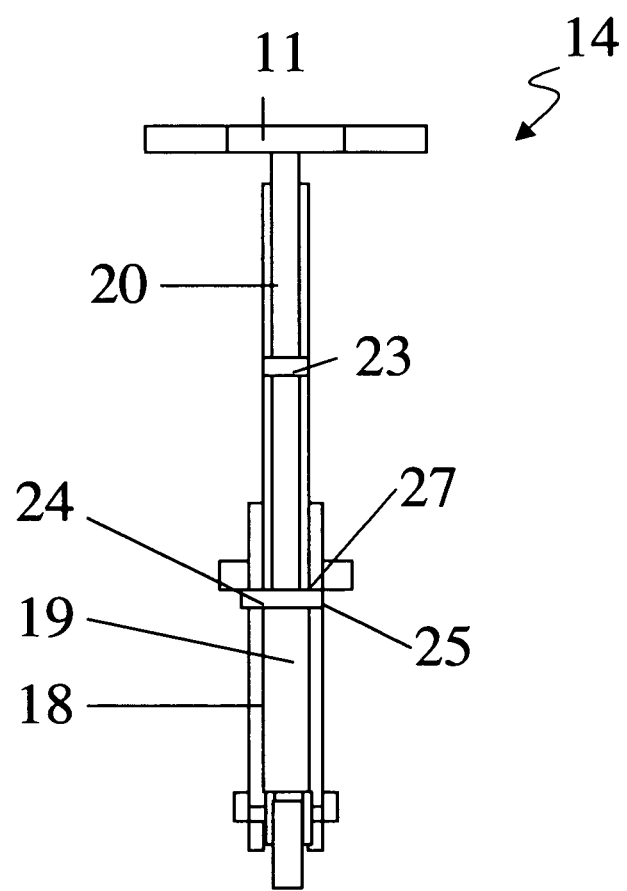
FIGS. 5, 6, 7, 8, and 9 are front views of the steering column assembly with the plastic frame cut away.

The following Figures demonstrate the arrangement of column members 18, 19, and 20. In FIG. 5, the steering column assembly 14 is shown in its entirety while in its closed position known as position 1. The combination scooter/backpack 1 is in the backpack mode of use and is to be converted to scooter mode. The handlebar 11 is in the it's lowest position against the top of the plastic frame sections. The upper button set 23 of inner column member 20 are depressed and inside the middle column 19 unable to extend. Lower button set 24, however, is extended completely through slots 27 of the middle column 19 and openings 25 of outer column 18, thereby linking the impending vertical travel of the outer and inner column members 18 and 20. Rotational movement of the handlebar is prevented due to the square cross section of outer column 18 constrained inside plastic frame sections 4 and 8.

Figure 6:
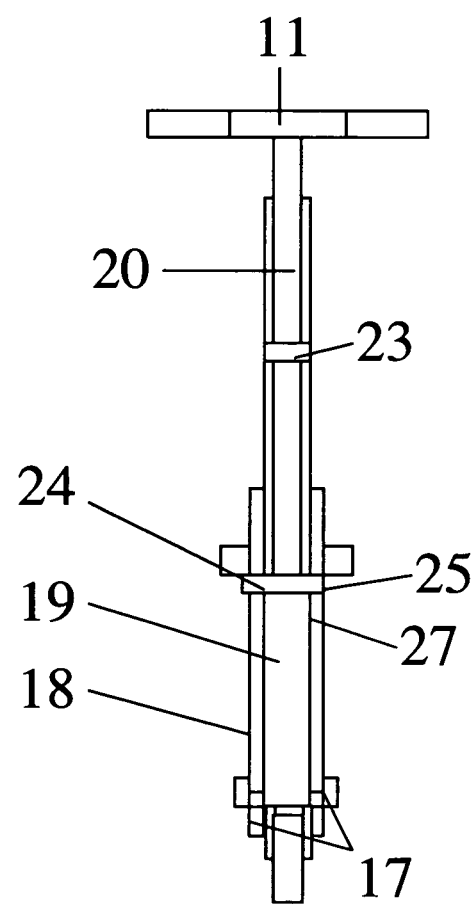

In FIG. 6, the combination scooter/backpack 1 is in Position 2. The handlebar 11 has been lifted a small distance causing outer column member 18 to travel upwards the same amount. Middle column 19 remains unaffected because lower buttons 24 travel within slots 27. Preferably, slot 27 is slightly longer than the initial raise of handlebar 11. As will be shown, lifting outer column 18 will cause board 9 to rotate by means of linkage arms 17. This prepares the combination scooter/backpack 1 for scooter mode, and allows user access to the lower button set 24, which was previously covered by board 9.

Figure 7:
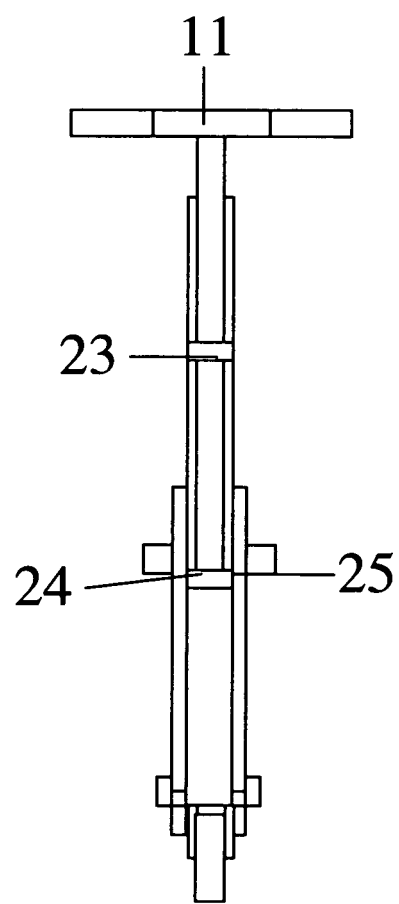

In FIG. 7, the user has depressed lower button set 24 far enough to sink into middle column 19 to allow additional vertical travel of handlebar 11.

Figure 8:
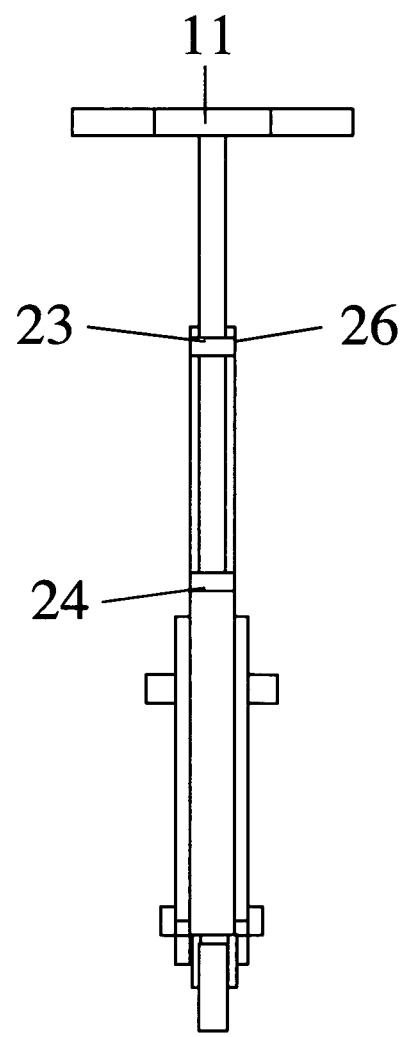

In FIG. 8, the combination scooter/backpack 1 is in Position 4. Handlebar 11 has been lifted to the height for steering use in scooter mode. Lower button set 24 is depressed and contained inside middle column 19. Upper button set 23, previously depressed and inside middle column 19, are now aligned with openings 26.

Figure 9:
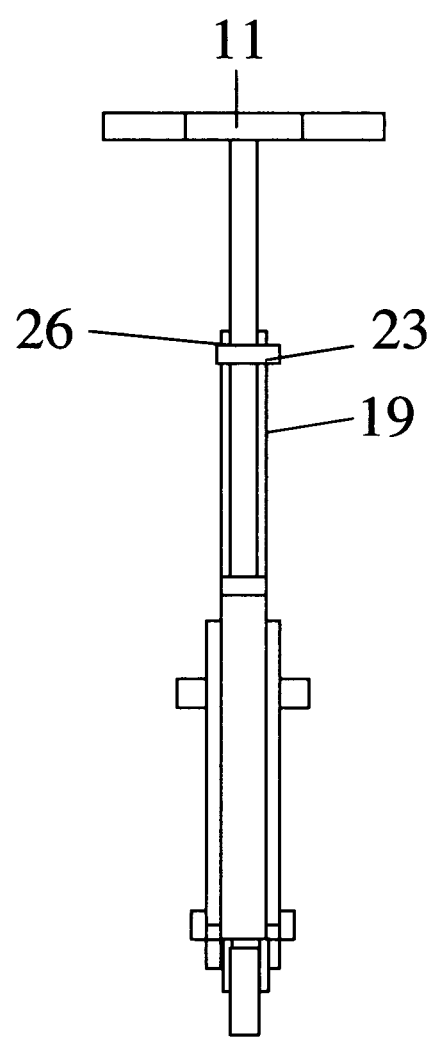

In FIG. 9, the combination scooter/backpack 1 is in Position 5. Upper button set 23 extends under the push of its spring through the openings 26 of middle column 19. Torque can now be effectively transmitted from handlebar 11 to front wheel 12 during steering. The steering assembly 14 is now configured for scooter mode.

FIGS. 5-9 show the conversion process from backpack to scooter modes of the combination scooter/backpack 1. Performing this process in reverse will successfully convert combination scooter/backpack 1 from scooter mode to backpack. The user would dismount from board 9 and depress upper button set 23 into openings 26 of middle column 19. Then, lowering handlebar 11 a first distance will allow lower button set 24 to extend through slots 27 and openings 25 and engage middle and outer columns 19 and 20. A further lowering of handlebar 11 will lower outer column 18 and cause linkage arms to rotate around hinge pin 28. Through board plate 29, board 9 rotates upwardly to the vertical position and is prepared for flap 2 to surround and secure it to I-shaped plastic frame 8. Consequently, the combination scooter/backpack 1 is in backpack mode, and ready to be placed upon the user.

Figure 10:
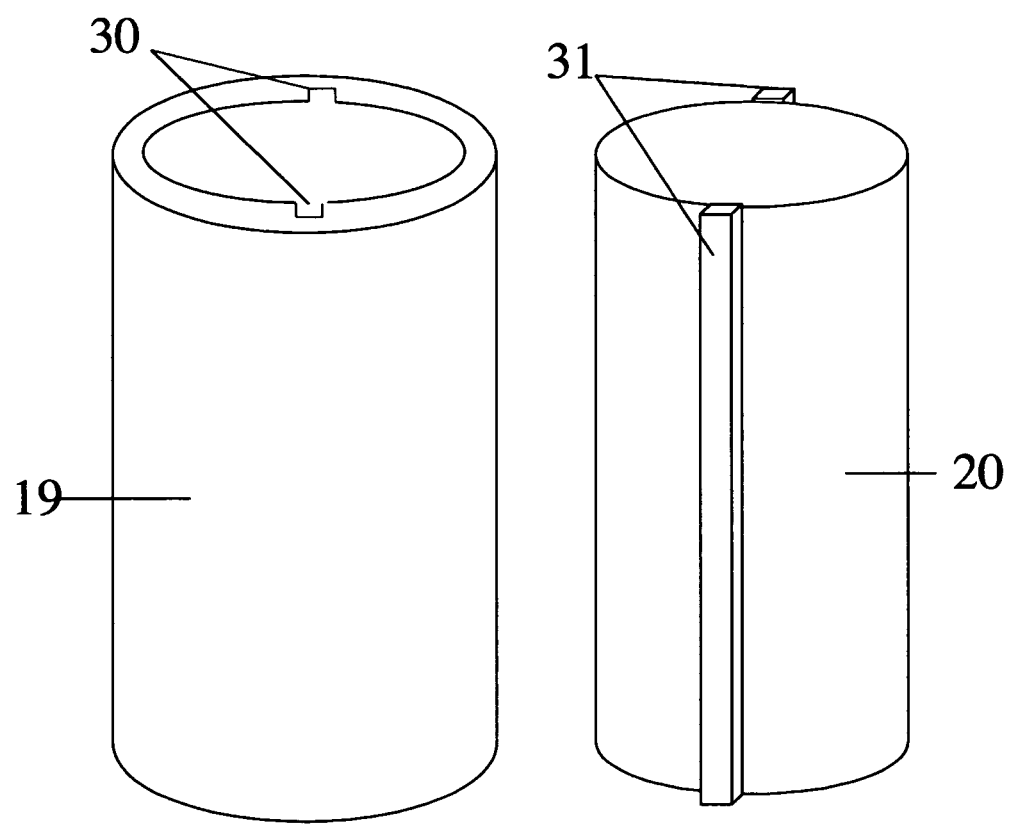
FIG. 10 is an isometric view showing the periphery of steering column members.

FIG. 10 shows the additional mating connection between the middle and inner columns 19 and 20. In addition to upper button set 23, inner and middle columns 19 and 20 are conjoined by flange 30 and groove 31. Flange 30 and groove 31 partially run the distance between upper and lower button sets 23 and 24, acting to assist the upper button set 23 in transmitting torque during steering and restrain the handlebar during backpack mode as well as other advantages.

Figure 11:
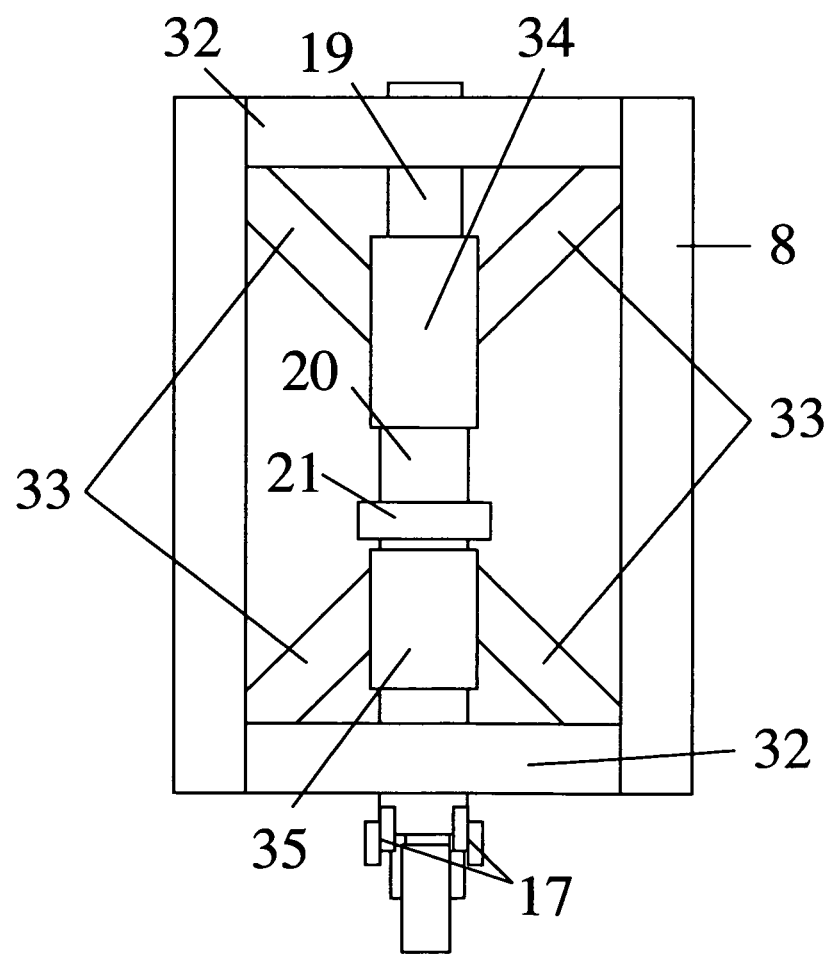
FIG. 11 is a rear view of the plastic frame and lower steering column members.

Turning now to FIG. 11, the I-shaped plastic frame section 8 is shown. The frame has a perimeter section 32. It should be noted that perimeter section 32 can be any thickness, internal or external, necessary to support a variety of rider sizes under a variety of riding connections. Perimeter section 32 defines a rectangular shape for plastic frame sections 4 and 8. Attached to perimeter section 32 are spokes 33 used to support upper stopper 34 and lower stopper 35. Upper and lower stoppers 34 and 35 function to limit the vertical travel of outer column 18 by contacting thickness 21. Referring to FIG. 9, the outer column 18 is in its lowest position and the combination scooter/backpack 1 is in backpack mode. Furthermore, it should be noted that features 32, 33, 34, and 35 of I-shaped plastic frame section 8 are mirrored in the vertical length of L-shaped plastic frame member 4, thereby completing the two halves of plastic frame necessary to surround steering column assembly 14.

Figure 12:
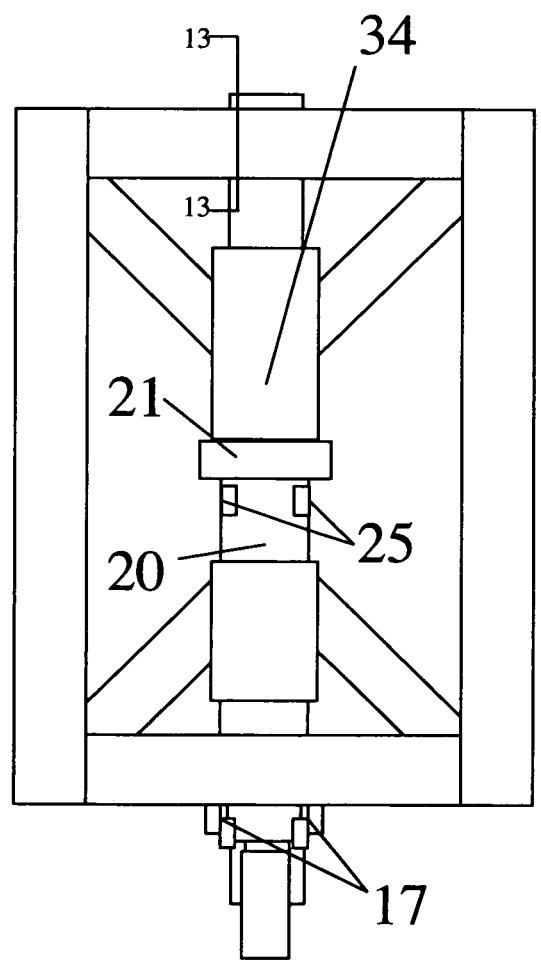
FIG. 12 is a rear view as in FIG. 11.

Continuing to FIG. 12, the outer column 18 has been raised a slight amount through its connection to the inner column 20 and handlebar 11. The thickness 21 contacts the upper stopper 34 thereby preventing further raising of the handlebar, indicating to the user that the board 9 is in the extended position. Additionally, openings 25 and lower button set 24 are exposed to the user, allowing depression of the buttons to advance the conversion process. Once lower button set 24 is depressed beneath middle column 19 the handlebar 11 and inner column 20 can be raised further. It should be noted that middle column 19 and front wheel 12 have remained motionless during the process between FIGS. 9 and 10.

Figure 13:
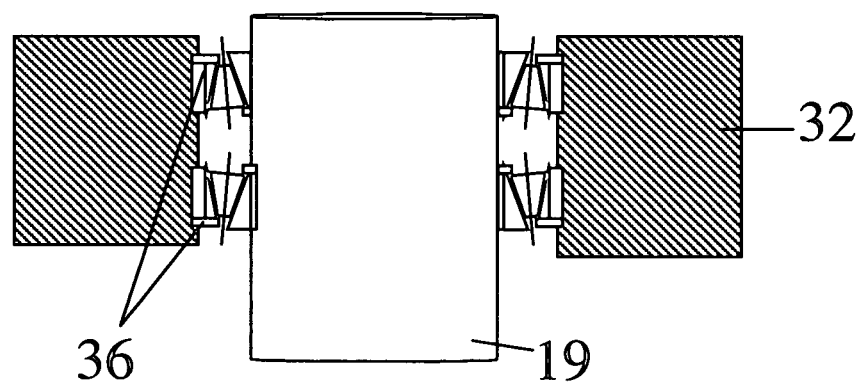
FIG. 13 is a cutaway view of the plastic frame and middle steering column member.

FIG. 13 details the connection between the middle column 19 and perimeter section 32. The connection is made through a bearing 36. In the preferred embodiment, two tapered roller bearings of typical industry standard should be mounted in an indirect configuration. The bearings 36 is paramount in its function to transmit the rider's weight from the board 9, through plastic frame sections 4 and 8, and onto the middle column 19 and front wheel 12. In the preferred embodiment, bearings 36 are placed in the perimeter section 32. In alternative embodiments, additional bearings 36 may be placed in other locations, such as the upper stopper 34 to aid in the transmission of weight between the plastic frame sections 4 and 8 and middle column 19. It should be noted that other means for connection between middle column 19 and frame sections 4 and 8 are possible. Roller bearings are only presented as a preferred means.

Figure 14A:
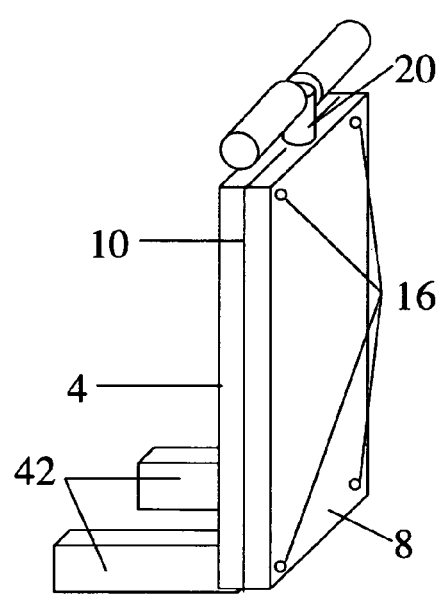
FIG. 14A is an isometric view of the frame sections and handlebar.
Figure 14B:
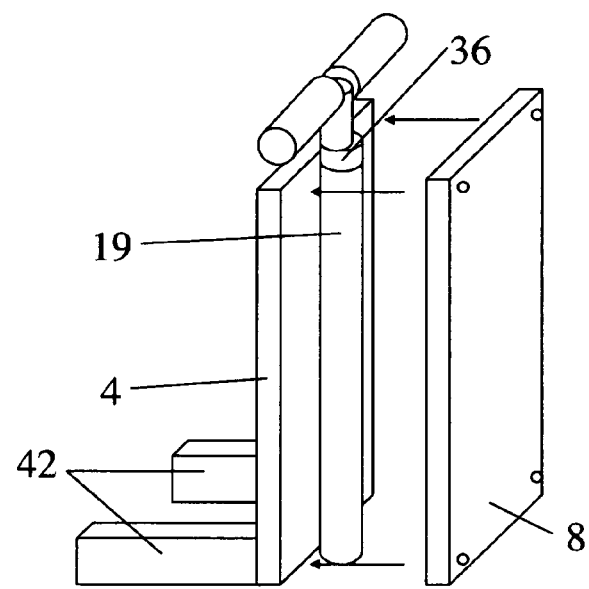
FIG. 14B is an exploded view of FIG. 14A.

FIGS. 14A and 14B highlight the connection between the steering column assembly 14 and plastic frame sections 4 and 8. As can be seen, I-shaped plastic frame section 8 fastens through fasteners 16 to the complementarily shaped L-shaped plastic frame section 4. Also included on L-shaped plastic frame section 4 are feet 42. Feet 42 function to provide support for loads carried in bag 3. In the preferred embodiment they are of rectangular cross-section but any shape may be implemented to achieve desired load-carrying performance. Additionally, FIG. 14B shows the connection between middle column 19 of steering column assembly 14 and plastic frame sections 4 and 8. Bearings 36 surround and secure middle column 19 to the perimeter section 32 and/or upper stopper 34 of plastic frame sections 4 and 8. This attachment will allow rotation of middle column 19 for steering, yet support against the axial and radial thrust loads that will result from user manipulation of handlebar 11. It should be noted that features 12, 32, 33, 34, and 35 have been omitted from FIGS. 14A and 14B for clarity.

Figure 15:
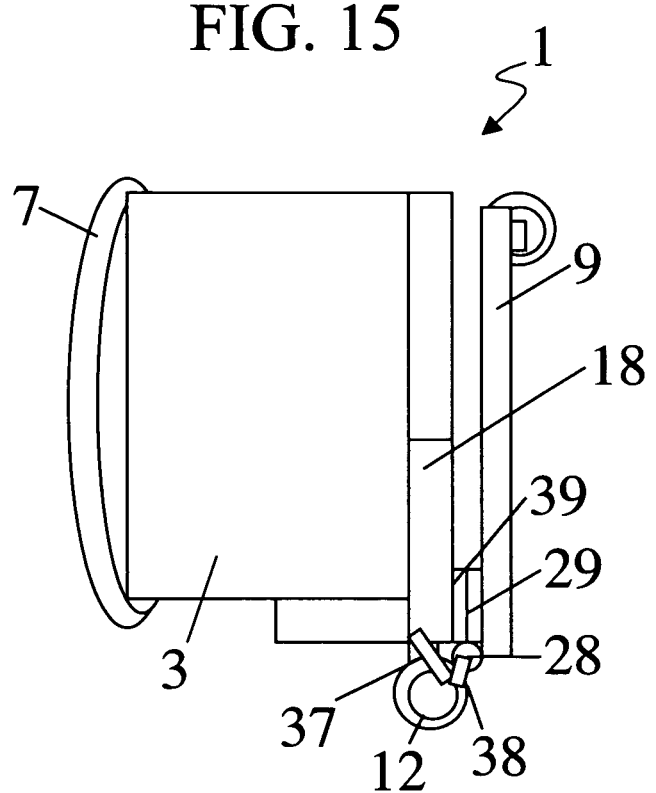
FIG. 15 is a side view of the combination scooter/backpack.

As shown in FIG. 15, the combination scooter/backpack is in the backpack mode. The board 9 is in the vertical position and the outer column 18 is in the lowest position. Linkage arms 17 are attached to the bottom of outer column 18. Linkage arms 17 are themselves a pivot joint connection between two arms, upper arms 37 and lower arms 38. Upper arms 37 are attached to the outer column 18 through a pivot connection and to lower arms 38 through a pivot connection. On their opposite end, lower arms 38 are fixedly connected to hinge pin 28 thereby linking vertical movement of outer column 18 and rotational movement of hinge pin 28. Upper and lower arms 37 and 38 are shown shaped in rectangular fashion, but other lengths, widths, and curvatures are possible to achieve desired rotational performance of board 9.

Figure 16:
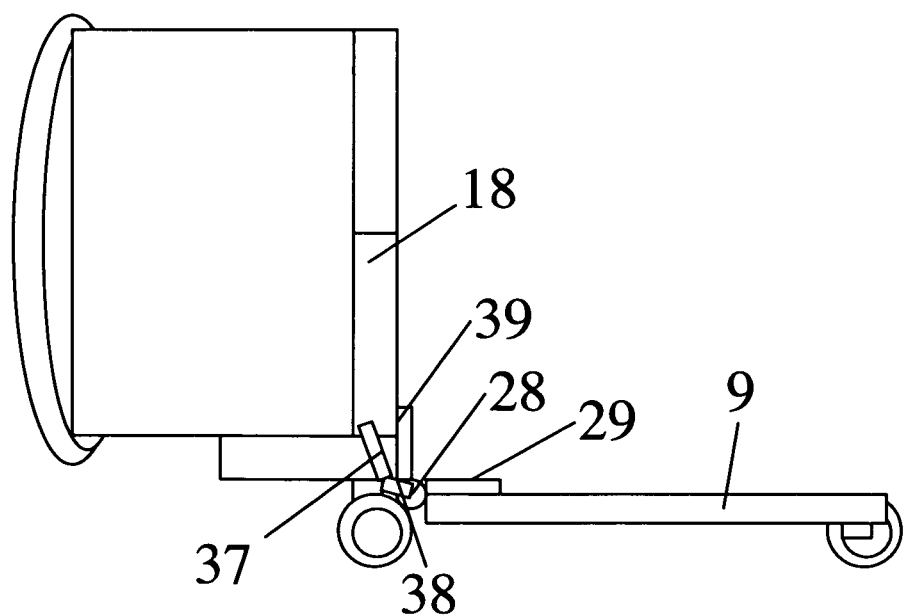
FIG. 16 is a side view as in FIG. 16.

FIG. 16 shows linkage arms 17 while the combination scooter backpack is in the scooter mode. The outer column 18 is in the raised position and board 9 is lowered for riding use. The outer column 18 has been raised and upper arms 37 have straightened and pulled on lower arms 38 causing rotation about hinge pin 28. As demonstrated, linkage arms 17 function to rotate board 9 not only with the raising, but lowering of handlebar 11.

Figure 17:
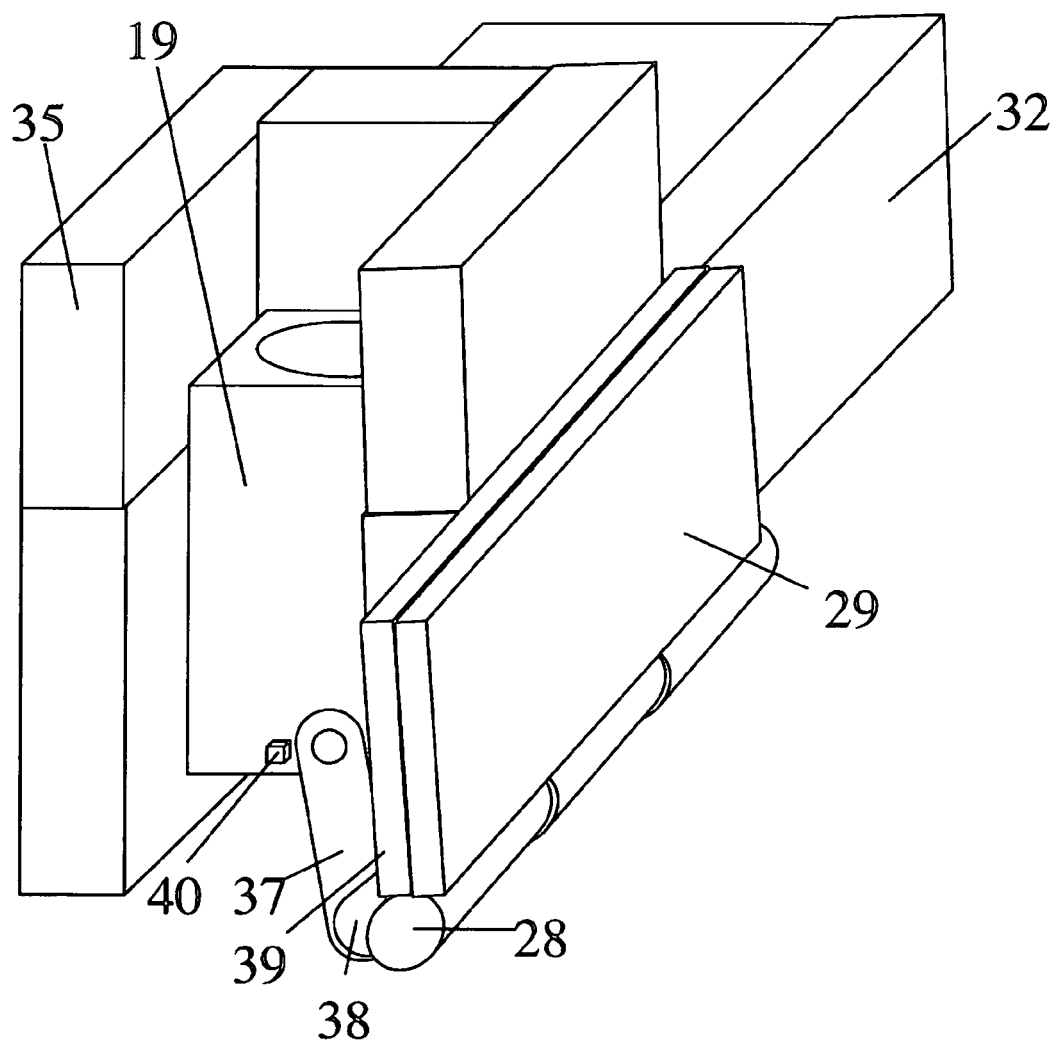
FIGS. 17, 18, and 19 are cutaway views of the plastic frame and hinge.

FIG. 17 is shown for purposes of highlighting the interaction between linkage arms 17, hinge pin 28, board hinge plate 29, and frame hinge plate 39. Sections of plastic frame sections 4 and 8 and outer column 18 have been removed for clarity. Outer column 18 is inside lower stopper 35. Upper arms 37 are pivotally connected to the bottom of outer column 18. Studs 40 are provided on outer column 18 to limit the arcuate path of upper arm 37 during the conversion process. Lower arm 38 is pivotally connected to upper arm 37 and fixedly connected to hinge pin 28. Thereby, lower arm 38 transmits the vertical displacement of upper arm 37 to rotation of hinge pin 28. Board hinge plate 29 is fixedly connected to hinge pin 28, thereby linking the angular rotation of hinge pin 28 to the rotation of board hinge plate 29 and board 9. Frame hinge plate 39 is fixedly attached along its face to the perimeter section 32 and pivotally connected to hinge pin 28. This allows hinge pin 28 to rotate independent of frame hinge plate 39. As can be seen in FIG. 17, the combination scooter backpack 1 is in backpack mode. Board hinge plate 29 and board 9 lay vertically against I-shaped plastic frame 8. The steering column assembly 14 is in Position 1.

Figure 18:
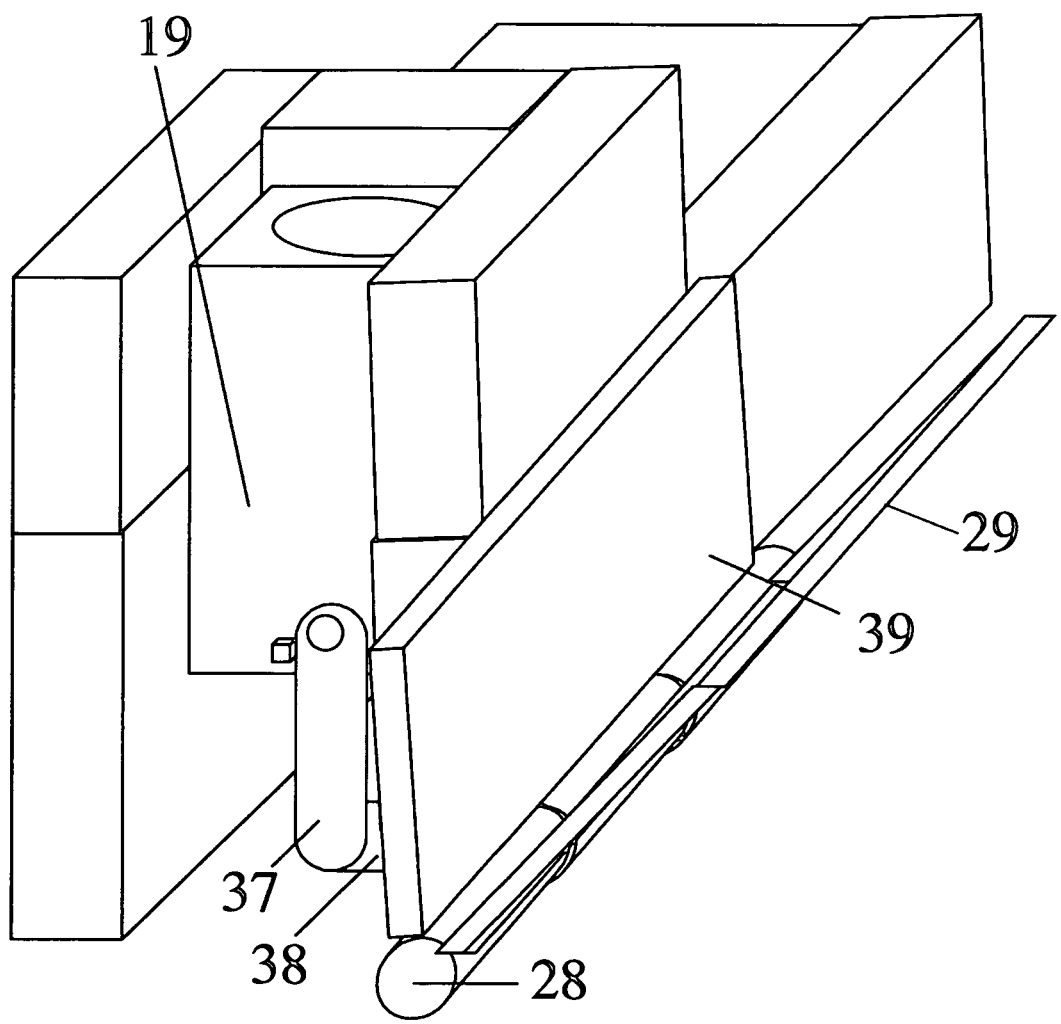

FIG. 18 shows the previous components in transition between Positions 1 and 2 of steering column assembly 14. Outer column 18 has been pulled up by its connection to handlebar 11 through lower button set 24. Lower arm 38 has been pulled up by upper arm 37 causing rotation of hinge pin 28 and board hinge plate 29.

Figure 19:
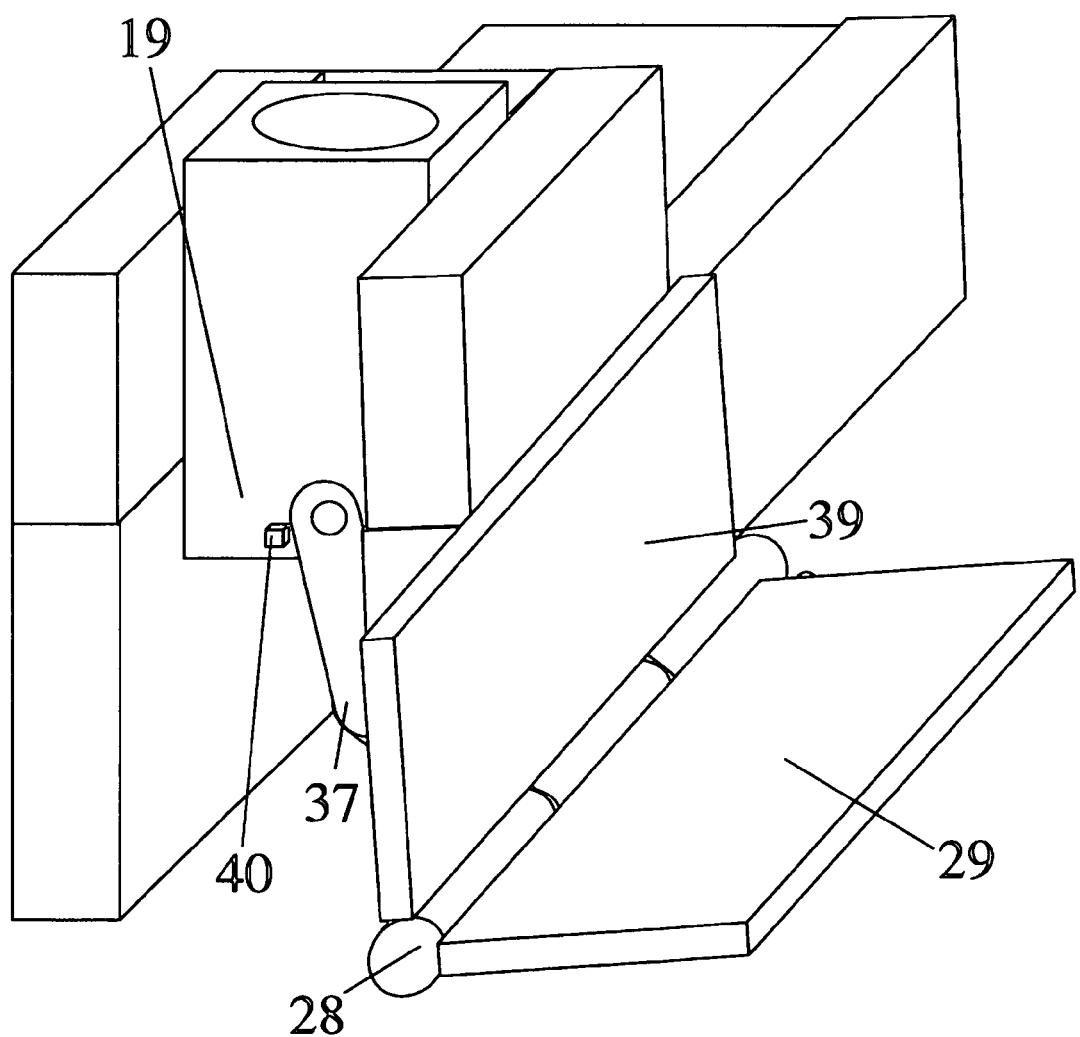

FIG. 19 shows outer column 18 and related hinge components in Position 2. Outer column 18 has reached its maximum height and board 9 has reached its extended position, reaching outwardly from the plastic frame.

Figure 21:
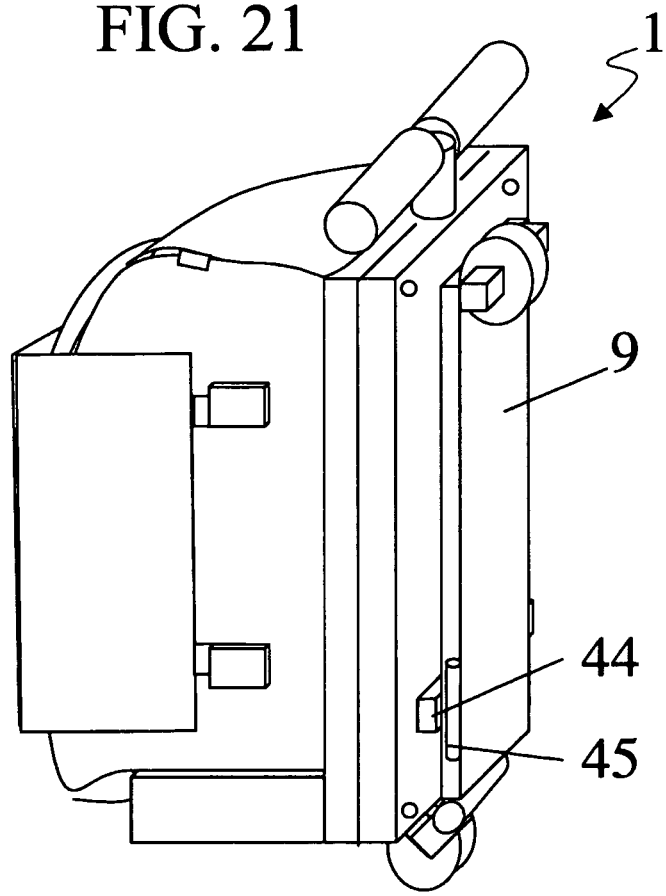
FIGS. 21, 22, and 23 are isometric views as in FIGS. 1, 2, and 3.
Figure 20:
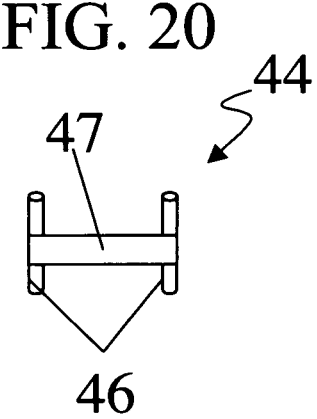
FIG. 20 is a front view of the board lock.
Figure 22:
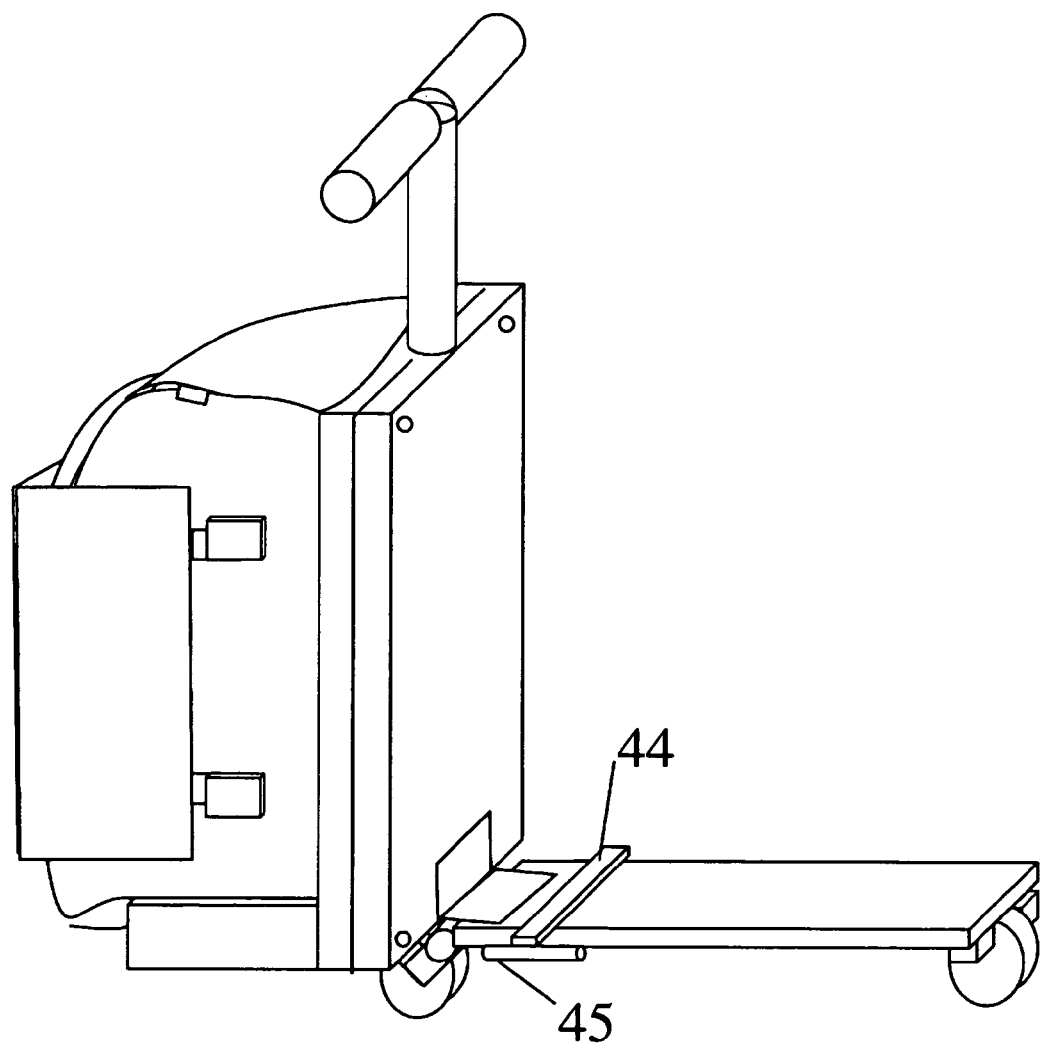
Figure 23:
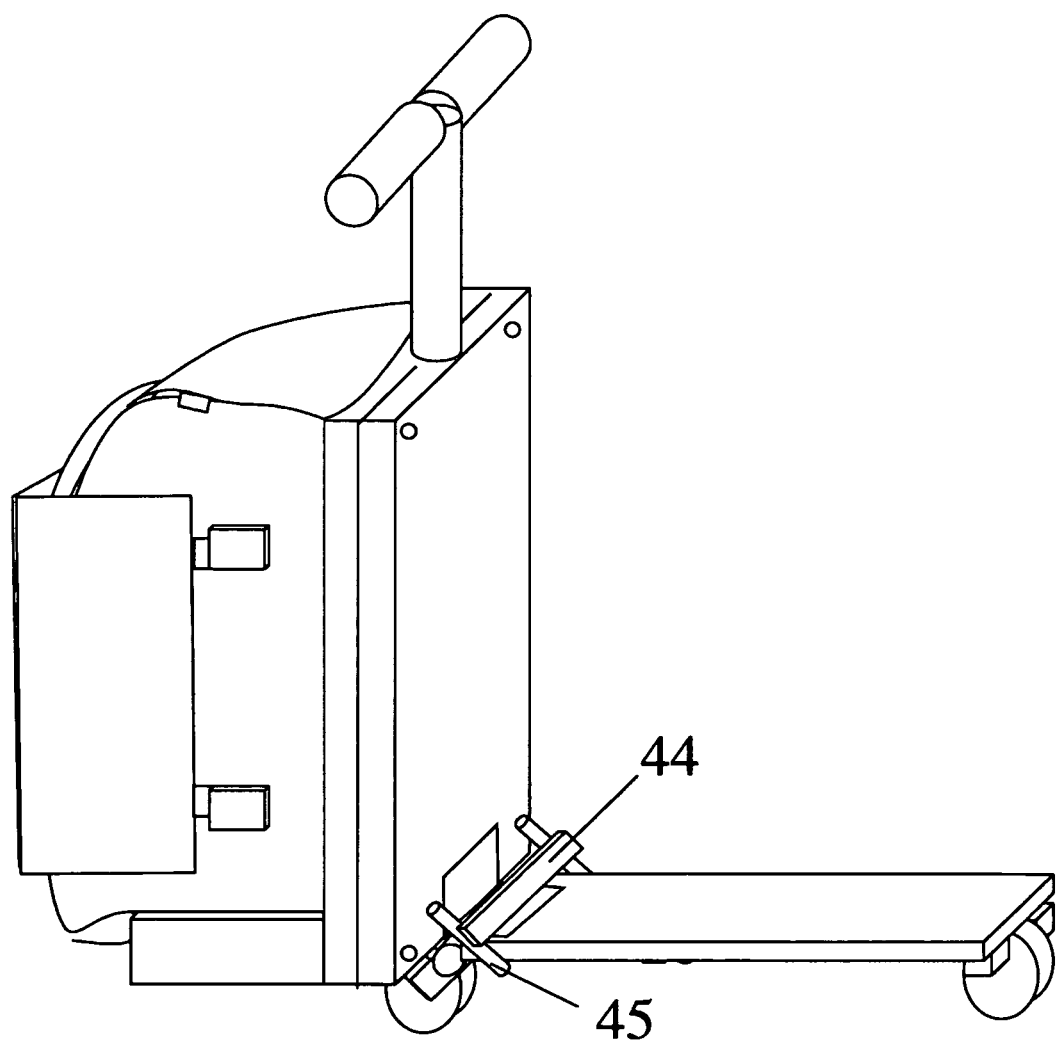

While the board 9 is secured to I-shaped plastic frame section 8 through flap 2 in backpack mode, board 9 requires an additional locking mechanism to secure it in the extended position during scooter mode. FIG. 20 shows a preferred embodiment of the mechanism used to lock board 9 in the extended position during the scooter mode of usage. Board lock 44 consists of two parallel arms 46 connected by a bridging member 47. FIGS. 21, 22, and 23 show the preferred embodiment of board lock 44 and its position on board 9. Board lock 44 is attached to board 9 pivotally at board lock joint 45. FIG. 21 shows the combination scooter/backpack 1 in backpack mode. Board lock 44 lies parallel to board 9, secured against plastic frame 8. In FIG. 22, handlebar 11 has been raised and caused outer column 18 to rotate board 9 to the extended position. Board lock 44 lies against board 9 ready for rotation. FIG. 23 shows board lock 44 rotated upwardly and around to press against frame section 8. In this position, board lock 44 resists any torque around hinge pin 28 that may occur from the user pulling on handlebar 11 during scooter mode. In the preferred embodiment, unique feet may be incorporated onto parallel arms 46 to better fit against I-shaped plastic frame 8. When converting from scooter mode to backpack, the process outlined in FIGS. 21-23 should be reversed. Board lock 44 should be rotated away and down from plastic frame section 8 and stowed against board 9, prepared for the rotation of board 9 to the vertical position.

We claim:

1. A wheeled vehicle, comprising:
a rigid frame configured to support a handle assembly;
a supporting unit including a first wheel, the supporting unit pivotable between a first position and a second position, wherein in the first position the supporting unit is arranged close to the handle assembly, and in the second position, the supporting unit is extending away from the handle assembly;
said handle assembly including a first column member, the first column member slidably attached to the frame and configured to be moved upwards and downwards away and towards the frame;
a handlebar attached to the first column member;
a mechanism attached to the frame, the supporting unit and the first column member, the mechanism configured to rotate the supporting unit about a pivot axis from the second position to the first position, when the first column member is moved downwards in a direction towards the frame;
and wherein the handlebar is close to the first wheel when the supporting unit is in the first position.

2. The wheeled vehicle according to claim 1, wherein in the first position the supporting unit is close to and substantially parallel to the handle assembly.

3. The wheeled vehicle according to claim 1, wherein in the second position the supporting unit is substantially perpendicular to the handle assembly.

4. A wheeled vehicle, comprising:
a rigid frame configured to support a handle assembly;
a supporting unit including a first wheel, the supporting unit pivotable between a first position and a second position, wherein in the first position the supporting unit is arranged close to the handle assembly, and in the second position, the supporting unit is extending away from the handle assembly;
said handle assembly including a first column member, the first column member slidably attached to the frame and configured to be moved upwards and downwards away and towards the frame;
a handlebar attached to the first column member;
a collar member which is slidably attached to the handle assembly;
at least one link member pivotally attached to said collar member and pivotally attached to said supporting unit;
and wherein said movement of collar member downwards correspondingly rotates said supporting unit from the second position to the first position through said link member.

5. The wheeled vehicle according to claim 4, further comprising:
a means for selective contact between said first column member and said collar member; and
wherein when said first column member is in contact with said collar member, movement of said first column downwards correspondingly moves said collar member downwards.

6. The wheeled vehicle according to claim 4, wherein the collar member completely surrounds a portion of the handle assembly.

7. The wheeled vehicle according to claim 4, wherein at least two link members are pivotally attached to said collar member and pivotally attached to said supporting unit.

8. The wheeled vehicle according to claim 4, wherein the handlebar is close to the first wheel when the supporting unit is in the first position.

9. The wheeled vehicle according to claim 4, wherein in the first position the supporting unit is close to and substantially parallel to the handle assembly.

10. The wheeled vehicle according to claim 4, wherein in the second position the supporting unit is substantially perpendicular to the handle assembly.

11. A wheeled vehicle, comprising:
a rigid frame configured to support a handle assembly;
a supporting unit including a first wheel, the supporting unit pivotable between a first position and a second position, wherein in the first position the supporting unit is arranged close to the handle assembly, and in the second position, the supporting unit is extending away from the handle assembly;

said handle assembly including a first column member, the first column member slidably attached to the frame and configured to be moved upwards and downwards away and towards the frame;

a mechanism attached to the frame, the supporting unit and the first column member, the mechanism configured to rotate the supporting unit about a pivot axis from the second position to the first position, when the first column member is moved downwards in direction towards the frame;

a second column member, the first column member arranged in a longtiudinal slidable relationship with the second column member;

a second wheel;

wherein the first column member is configured to turn the second column member and the second wheel about the longitudinal axis.

12. The wheeled vehicle according to claim 11, wherein the mechanism is further configured to rotate the supporting unit about a pivot axis from the first position to the second position, when the first column member is moved upwards in a direction away from the frame.

13. The wheeled vehicle according to claim 11, further comprising a fastening mechanism configured to fasten the first column member to a position relative to the frame in the longitudinal direction.

14. The wheeled vehicle according to claim 13, wherein when the first column member is fastened to the position relative to the frame in the longitudinal direction, the supporting unit is located in the first position.

* * * * *